United States Patent

[11] 3,624,136

[72] Inventor Mahmoud S. Kablaoui
Wappingers Falls, N.Y.
[21] Appl. No. 15,299
[22] Filed Feb. 27, 1970
[45] Patented Nov. 30, 1971
[73] Assignee Texaco Inc.
New York, N.Y.

[54] METHOD OF PREPARING CATECHOL DIACETATES
4 Claims, No Drawings

[52] U.S. Cl. .................................................. 260/479 R,
260/621 G, 260/624 R, 260/625
[51] Int. Cl. .................................................. C07c 69/16
[50] Field of Search ........................................ 260/479 R

[56] References Cited
OTHER REFERENCES

Doering et al., J. Am. Chem. Soc., Vol. 71, pages 2221-2226 (1949)

*Primary Examiner*—James A. Patten
*Attorneys*—Thomas H. Whaley, Carl G. Ries and Robert A. Kulason ABSTRACT: A method of preparing a catechol diacetate of the formula:

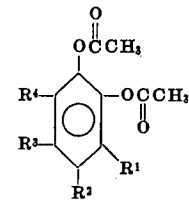

where $R^1$, $R^2$, $R^3$ and $R^4$ are hydrogen or alkyl comprising contacting 2-acetoxycyclohexanone of the formula:

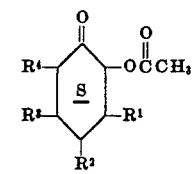

where $R^1$, $R^2$, $R^3$ and $R^4$ are as heretofore defined, with acetic anhydride, preferably in admixture with acetic acid, in the presence of boron trifluoride etherate, subsequently contacting the resultant mixture with concentrated sulfuric acid.

METHOD OF PREPARING CATECHOL DIACETATES

BACKGROUND OF INVENTION

The invention relates to the preparation of alkylated and nonalkylated catechol diacetates.

The catechol diacetate products contemplated herein are readily converted by standard hydrolysis techniques to nonalkylated catechol and alkylated catechol, the former useful in pharmaceutical manufacture and the latter as dispersants in drilling muds.

In the past, preparation of dihydroxybenzene compounds via aromatization of ketonic compounds had been disappointing particularly in the are of obtaining satisfactory yields in a reasonable period of time. One prior method called for contacting cyclohexanediones with a palladium-on-carbon catalyst and in another similar procedure Raney nickel in a sodium hydroxide solution was employed as the catalytic material. In either situation the yields were poor.

DESCRIPTION OF THE INVENTION

I have discovered and this constitutes my invention a method of converting an acetoxycyclohexanone and alkylated acetoxycyclohexanone in high yields into corresponding catechol diacetate and alkylated catechol diacetate. The process is relatively rapid, highly selective, relatively inexpensive and high yields of product are accompanied by ease of isolation of the diacetate product. Further, with negligible loss the diacetate can be easily converted into a corresponding catechol via standard hydrolysis techniques.

Specifically, the catechol diacetates of the general formula:

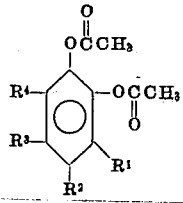

where $R^1$, $R^2$, $R^3$ and $R^4$ are hydrogen or alkyl of from one to 20 carbons is prepared by first contacting a 2-acetoxycyclohexanone of the formula:

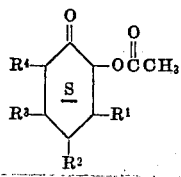

where $R^1$, $R^2$, $R_3$ and $R^4$ are as heretofore defined with acetic anhydride and boron trifluoride etherate [$BF_3 \cdot (C_2H_5)_2O$] at a temperature between about 30° and 500° C., preferably between about 80° and 150° C., and in the additionally preferred presence of acetic acid utilizing a mole ratio of said acetic anhydride to said acetoxycyclohexanone of at least about 1:1 and up to 100:1 or more, preferably between about 5:1 and 20:1, the excess acetic anhydride functioning as reaction diluent. When employed, acetic acid normally constitutes between about 30 and 70 wt. percent of the reaction mixture. The reaction time is desirably about 0.5 hours and 2 hours or more. The resultant reaction mixture is subsequently contacted with concentrated sulfuric acid at a temperature between about 30° and 500° C., preferably between about 80° and 150° C., utilizing a mole ratio of said sulfuric acid to said acetoxycyclohexanone of at least about 0.05:1 and 5:1, preferably between about 1:1 and 2:1. The reaction period in the second contacting is of the same scope as in the first contacting. In the final analysis, however, reaction time under commercial conditions will be dictated by the economics of yield versus time. Superatmospheric pressure is contemplated at temperatures above the boiling point of one or more of the reaction ingredients.

Both the first and second stages of the reaction are advantageously conducted under conditions of agitation in order to facilitate contact and further are advantageously conducted in an inert gas atmosphere such as nitrogen. If necessary to facilitate ingredient contact and product recovery diluent may be employed. Suitable examples of such diluents are excess acetic anhydride or other volatilizable solvents such as toluene, benzene, heptane, hexane, chloroform, carbon tetrachloride, chlorobenzene and cyclohexane. The diluents (if employed) normally constitute between about 25 and 90 wt. percent of the reaction mixture.

The catechol diacetate product can be recovered from the resultant reaction mixture by standard means. One such means of recovery comprises first removing excess acetic anhydride and acetic acid via fractional distillation, quenching the residue in water wherein the water content in the resultant quenched mixture is between about 1 and 50 wt. percent, said quenching conducted at a temperature desirably between about 0° and 50° C., extracting the aqueous mixture with a water immiscible, volatilizable solvent for the catechol diacetate, washing the solvent layer with an aqueous alkali base, e.g., 0.1 to 7 wt. percent aq. sodium bicarbonate, subjecting the washed solvent solution to fractional distillation to remove the volatilizable solvent leaving the catechol diacetate as residue.

The conversion of the catechol diacetate product to the corresponding catechol compound can be accomplished by established hydrolysis techniques such as contacting the catechol diacetate with aqueous mineral acid (e.g., 0.1 to 1 wt. percent aq. HCl utilizing a catechol diacetate to aqueous acid weight ratio of between about 1:2 and 1:100 at a temperature between about 30° and 100° C., most preferably under reflux conditions, followed by extracting the formed dihydroxybenzene from the aqueous acid solution with a water immiscible, volatilizable solvent for the resultant catechol compound and separating the dihydroxybenzene product from the solvent in the manner outlined in respect to the recovery of the catechol diacetate.

In regard to the material features of the invention, elimination of any of the materials or step sequence as defined either result in substantially reduced yields or no yield of the desired catechol diacetate product. For example, deletion of boron trifluoride etherate from the first stage reaction results in a manifold decrease in yield of final diacetate product. Further, elimination of the preferred acetic acid component results in a decrease in yield. Still further, elimination of the employment of sulfuric acid and acetic anhydride renders the process inoperative. Still further, when 3-acetoxycyclohexanone or substituted 3-acetoxycyclohexanone was treated as above, no diacetoxybenzene or substituted diacetoxybenzene is obtained.

By the term "concentrated sulfuric acid" hereinbefore and hereinafter recited an acid composition consisting of between 95 and 100 wt. percent $H_2SO_4$ and between 0 to 5 wt. percent $H_2O$ is intended.

Examples of the volatilizable selective solvents for the diacetate and catechol products contemplated herein are ether, benzene, chloroform and carbon tetrachloride.

Examples of the 2-acetoxycyclohexanone reactant contemplated herein are 2-acetoxycyclohexanone, 2-acetoxy-4-methylcylcohexanone, 2-acetoxy-3-hexylcyclohexanone, 2-acetoxy-5-pentylcyclohexanone and 2-acetoxy-3,4,5,6-tetramethylcyclohexanone. Corresponding catechol diacetate products are catechol diacetate, 4-methylcatechol diacetate, 3-hexylcatechol diacetate, 5-pentylcatechol diacetate and 3,4,5,6-tetramethylcatechol diacetate. Corresponding dihydroxybenzene derivatives are catechol, 4-methylcatechol, 3-hexylcatechol, 5-pentylcatechol and 3,4,5,6-tetramethylcatechol.

The acetoxycyclohexanone reactants can be prepared by acylating cyclohexanone; e.g., by contacting cyclohexanone with acetic anhydride in the presence of catalytic amounts (between about 0.01 and 0.5 wt. percent) of concentrated sulfuric acid at between about 30° and 140° C., desirably in the presence of solvent such as excess acetic anhydride or xylene to form a 1-cyclohexenyl acetate intermediate. The formed 1-cyclohexenyl acetate is then epoxidized, e.g., by contacting the perbenzoic acid to form 1-acetoxy-1,2-epoxycyclohexane in the presence of catalyst such as molybdenum, vanadium or tungsten catalyst, e.g., molybdenum hexacarbonyl and in the additional presence of benzene or other suitable solvents. The 1-acetoxy-1,2-epoxycyclohexanone intermediate upon heating, e.g., between about 30° and 100° C. decomposes into the desired 2-acetoxycyclohexanone. The epoxidation-cleavage of cyclohexenylacetate to 2-acetoxycyclohexanone can also be accomplished in one step by treatment with t-butylhydroperoxide and catalytic amounts of molybdenum hexacarbonyl in refluxing benzene.

The following examples further illustrated the invention but are not to be construed as limitations thereof.

EXAMPLE I

This example illustrates the preparation of the 2-acetoxycyclohexanone.

Into a 200 mls. flask equipped with a magnetic stirrer, heating mantle and condenser, there were charged 98.0 grams of cyclohexanone, 294 grams acetic anhydride and 6.0 grams of concentrated (96 wt. percent) sulfuric acid. The resultant mixture was refluxed for a period of 2 hours and the resultant formed 1-cyclohexenylacetate in an amount of 127.0 grams representing 91 wt. percent yield was recovered by quenching the mixture in 200 mls. of ice water, stirring for 10 minutes, then extracting with four 100 mls. portions of ether, the ether extract layers were combined, dried and fractionally distilled. Ether was recovered at atmospheric pressure and 1-cyclohexenylacetate recovered at reduced pressure.

Subsequently, into a 200 ml. flask equipped with a magnetic stirrer, a heating mantle and condenser, there were charged 5 grams of the formed 1-cyclohexenylacetate, 100 grams of benzene, 0.05 grams molybdenum hexacarbonyl and 8 grams of 79 wt. percent tertiary butyl hydroperoxide. The reaction mixture was heated to reflux (80° C.) for 10 hours and work-up of the reaction was as follows:

The reaction mixture was cooled to about 10° C. The catalyst was filtered out and the solution was distilled to give benzene and t-butyl alcohol at atmospheric pressure and reaction starting material and product at reduced pressure. There were recovered 3.41 grams of 2-acetoxycyclohexanone.

EXAMPLE II

This example illustrates the method of the invention and the advantages thereof.

Into a 200 mls. 3-necked flask equipped with a magnetic stirrer, gas sparger, a condenser and thermometer, there were charged 2-acetoxycyclohexanone (as prepared in example I), acetic anhydride ($Ac_2O$), acetic acid (HOAc) (in preferred run A) and boron trifluoride etherate ($BF_3 \cdot Et_2O$). The reaction mixture was heated to reflux while dry nitrogen was passed through at a rate of 140 mls. per minute. The mixture was then cooled to about 10° C. and concentrated (96 wt. percent) sulfuric acid was added slowly so the temperature remained below about 15°C. The reaction mixture was heated and at the end of the reaction period the formed catechol diacetate product was recovered by the following work-up:

The reaction mixture was added to 100 mls. of ice water and stirred for one-half hour to decompose the excess $AC_2O$. It was then extracted with three 50 mls. portions of ether. The ether layers were combined and washed with two 50 mls. portions of saturated sodium bicarbonate aqueous solution (about 7 percent wt. of $NaHCO_3$), once with 50 mls. of saturated aqueous solution of sodium chloride, dried and the ether distilled to give a residue which upon distillation under vacuum affords catechol diacetate.

The test data and results are reported under runs A, B and C in table I below. In addition, comparative runs D, E and F were made.

TABLE I

| Run | A | B | C | D | E | F |
|---|---|---|---|---|---|---|
| Reaction ingredients: | | | | | | |
| Acetoxy cyclohexanone, g | 4.1 | 4.1 | 4.1 | 4.1 | 4.1 | 4.1 |
| $BF_3 \cdot Et_2O$, g | 0.9 | 0.9 | 0.9 | | 0.9 | 0.9 |
| $H_2SO_4$, g | 5.2 | 5.2 | 5.2 | 5.2 | | 5.2 |
| $Ac_2O$, g | 30.0 | 50.0 | 50.0 | 50.0 | 30.0 | |
| HOAc, g | 30.0 | | | | 30.0 | 30 |
| Reaction conditions: | | | | | | |
| Stage I: | | | | | | |
| Temp., °C | 118 | 140 | 140 | | 118 | 118 |
| Time, hrs | 1 | 1 | 1 | | 1 | 1 |
| Stage II: | | | | | | |
| Temp., °C | 100 | 100 | 100 | 100 | 100 | 100 |
| Time, hrs | 2 | 3 | 3 | 1 | 2 | 2 |
| Yield, wt. percent[1] | 95 | 40 | 60 | 15 | [2]0 | 0 |

[1] Catechol diacetate.
[2] Only 1, 2-diacetoxycyclohex-1-ene was obtained.

I claim:

1. A method of preparing catechol diacetate of the formula:

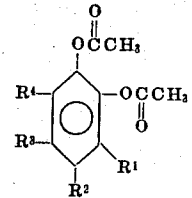

where $R^1$, $R^2$, $R^3$ and $R^4$ are hydrogen or alkyl of from one to 20 carbons comprising first contacting a 2-acetoxycyclohexanone of the formula:

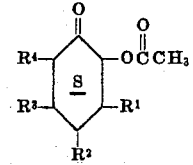

where $R^1$, $R^2$, $R^3$ and $R^4$ are as heretofore defined with a mixture of boron trifluoride etherate, acetic anhydride at a first temperature between about 30° and 500° C., utilizing a first mole ratio of said acetic anhydride to said acetoxycyclohexanone of at least about 1:1 said etherate present in an amount between 0.1 and 10 wt. percent of the first reaction mixture, subsequently second contacting said first reaction mixture with concentrated sulfuric acid at a second temperature between about 30° and 500° C., utilizing a second mole ratio of said sulfuric acid to said acetoxycyclohexanone of at least about 0.05:1.

2. A method in accordance with claim 1 wherein said first and second contacting are conducted in the presence of an inert gas atmosphere under conditions of agitation.

3. A method in accordance with claim 1 wherein said first mole ratio is between about 5:1 and 20:1, said second mole ratio is between about 1:1 and 2:1, said first and second temperature is between 80° and 150° C., said first contacting conducted in the additional presence of between about 30 and 70 wt. percent acetic acid basis said first reaction mixture.

4. A method in accordance with claim 1 wherein $R^1$, $R^2$, $R^3$ and $R^4$ are hydrogen.